(12) United States Patent
Llach et al.

(10) Patent No.: US 8,447,124 B2
(45) Date of Patent: *May 21, 2013

(54) FILM GRAIN SIMULATION FOR NORMAL PLAY AND TRICK MODE PLAY FOR VIDEO PLAYBACK SYSTEMS

(75) Inventors: Joan Llach, Princeton, NJ (US); Jeffrey Allen Cooper, Rocky Hill, NJ (US); Cristina Gomila, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1629 days.

This patent is subject to a terminal disclaimer.

(21) Appl. No.: 11/268,070

(22) Filed: Nov. 7, 2005

(65) Prior Publication Data

US 2006/0104608 A1 May 18, 2006

Related U.S. Application Data

(60) Provisional application No. 60/627,756, filed on Nov. 12, 2004.

(51) Int. Cl.
*G06K 9/36* (2006.01)
*G06K 9/46* (2006.01)

(52) U.S. Cl.
USPC ...................................................... 382/233

(58) Field of Classification Search
USPC .................. 382/232, 233, 274; 375/240.26
See application file for complete search history.

(56) References Cited

U.S. PATENT DOCUMENTS

| | | | |
|---|---|---|---|
| 4,897,775 A | 1/1990 | Kaassens |
| 4,935,816 A | 6/1990 | Faber |
| 4,998,167 A | 3/1991 | Jaqua |
| 5,028,280 A | 7/1991 | Ihara et al. |
| 5,140,414 A | 8/1992 | Mowry |
| 5,216,556 A | 6/1993 | Steinberg et al. |
| 5,262,248 A | 11/1993 | Ihara et al. |
| 5,285,402 A | 2/1994 | Keith |
| 5,335,013 A | 8/1994 | Faber |
| 5,374,954 A | 12/1994 | Mowry |
| 5,406,326 A | 4/1995 | Mowry |
| 5,453,840 A | 9/1995 | Parker et al. |
| 5,457,491 A | 10/1995 | Mowry |
| 5,461,596 A | 10/1995 | Barrett |
| 5,471,572 A | 11/1995 | Buchner |

(Continued)

FOREIGN PATENT DOCUMENTS

| | | |
|---|---|---|
| EP | 0364285 | 4/1990 |
| EP | 0373615 | 6/1990 |

(Continued)

OTHER PUBLICATIONS

Office Action from U.S. Appl. No. 10/556,834 mailed Aug. 19, 2008.

(Continued)

*Primary Examiner* — Phuoc Tran
(74) *Attorney, Agent, or Firm* — Robert D. Shedd; Robert B. Levy (57) ABSTRACT

There is provided method and apparatus for film grain simulation for normal play and trick mode play for video playback systems. A method for simulating film grain in video includes the step of performing (214) film grain simulation on a sequence of decoded video pictures in decode order.

25 Claims, 3 Drawing Sheets

U.S. PATENT DOCUMENTS

| | | |
|---|---|---|
| 5,475,425 A | 12/1995 | Przyborski et al. |
| 5,526,446 A | 6/1996 | Adelson et al. |
| 5,550,815 A | 8/1996 | Cloonan et al. |
| 5,629,769 A | 5/1997 | Cookingham et al. |
| 5,641,596 A | 6/1997 | Gray et al. |
| 5,659,382 A | 8/1997 | Rybczynski |
| 5,687,011 A | 11/1997 | Mowry |
| 5,706,361 A | 1/1998 | Kent et al. |
| 5,709,972 A | 1/1998 | Cookingham et al. |
| 5,715,008 A | 2/1998 | Sekiguchi et al. |
| 5,742,892 A | 4/1998 | Chaddha |
| 5,767,860 A | 6/1998 | Zimmer et al. |
| 5,805,782 A | 9/1998 | Foran |
| 5,817,447 A | 10/1998 | Yip |
| 5,831,673 A | 11/1998 | Przyborski et al. |
| 5,832,172 A | 11/1998 | Jeon |
| 5,845,017 A | 12/1998 | Keyes |
| 5,917,609 A | 6/1999 | Breeuwer et al. |
| 6,067,125 A | 5/2000 | May |
| 6,134,200 A | 10/2000 | Timmermans |
| 6,216,838 B1 | 4/2001 | Bacher et al. |
| 6,219,838 B1 | 4/2001 | Cherichetti et al. |
| 6,233,647 B1 | 5/2001 | Bentz et al. |
| 6,269,180 B1 | 7/2001 | Sevigny |
| 6,285,711 B1 | 9/2001 | Ratakonda et al. |
| 6,327,304 B1 | 12/2001 | Miller et al. |
| 6,327,391 B1 | 12/2001 | Ohnishi et al. |
| 6,370,192 B1 | 4/2002 | Pearlstein et al. |
| 6,373,992 B1 | 4/2002 | Nagao |
| 6,441,918 B1 | 8/2002 | Hori |
| 6,459,699 B1 | 10/2002 | Kimura et al. |
| 6,496,221 B1 | 12/2002 | Wolf et al. |
| 6,559,849 B1 | 5/2003 | Anderson et al. |
| 6,587,509 B1 | 7/2003 | Suzuki et al. |
| 6,650,327 B1 | 11/2003 | Airey et al. |
| 6,665,369 B2 | 12/2003 | Ukita |
| 6,667,815 B1 | 12/2003 | Nagao |
| 6,724,942 B1 | 4/2004 | Arai |
| 6,728,317 B1 | 4/2004 | Demos |
| 6,744,928 B1 | 6/2004 | Juri et al. |
| 6,839,152 B2 | 1/2005 | Fan et al. |
| 6,868,190 B1 | 3/2005 | Morton |
| 6,963,668 B2 | 11/2005 | Engeldrum et al. |
| 6,990,251 B2 | 1/2006 | Edgar |
| 6,990,252 B2 | 1/2006 | Shekter |
| 6,995,793 B1 | 2/2006 | Albadawi et al. |
| 7,065,255 B2 | 6/2006 | Chen et al. |
| 7,092,016 B2 | 8/2006 | Morton et al. |
| 7,106,907 B2 | 9/2006 | Lin et al. |
| 7,245,783 B2 | 7/2007 | Fielding |
| 7,362,911 B1 | 4/2008 | Frank |
| 7,596,239 B2 | 9/2009 | Winger et al. |
| 7,630,005 B2 | 12/2009 | Takei |
| 7,653,132 B2 | 1/2010 | Dang |
| 7,664,337 B2 | 2/2010 | Balram et al. |
| 7,680,356 B2 | 3/2010 | Boyce et al. |
| 7,738,722 B2 | 6/2010 | Gomila et al. |
| 7,742,655 B2 | 6/2010 | Gomila et al. |
| 7,856,055 B2 | 12/2010 | Zhou et al. |
| 7,958,532 B2 | 6/2011 | Paul et al. |
| 2001/0056568 A1 | 12/2001 | Hirotsu et al. |
| 2002/0003903 A1 | 1/2002 | Engeldrum et al. |
| 2002/0016103 A1 | 2/2002 | Behnke |
| 2002/0034337 A1 | 3/2002 | Shekter |
| 2002/0106103 A1* | 8/2002 | Jones et al. .................. 382/100 |
| 2002/0133764 A1 | 9/2002 | Wang |
| 2002/0154140 A1 | 10/2002 | Tazaki |
| 2002/0163657 A1 | 11/2002 | Bogdanowicz et al. |
| 2002/0171649 A1 | 11/2002 | Fogg |
| 2003/0011615 A1 | 1/2003 | Tidwell |
| 2003/0031128 A1 | 2/2003 | Kim et al. |
| 2003/0043922 A1 | 3/2003 | Kalker et al. |
| 2003/0063778 A1 | 4/2003 | Rowe et al. |
| 2003/0068097 A1 | 4/2003 | Wilson et al. |
| 2003/0086623 A1 | 5/2003 | Berkner et al. |
| 2003/0101453 A1 | 5/2003 | Matsuyama et al. |
| 2003/0206231 A1 | 11/2003 | Chen et al. |
| 2003/0206662 A1 | 11/2003 | Avinash et al. |
| 2003/0218610 A1 | 11/2003 | Mech et al. |
| 2004/0006575 A1 | 1/2004 | Visharam et al. |
| 2004/0013308 A1 | 1/2004 | Jeon et al. |
| 2004/0071363 A1 | 4/2004 | Kouri et al. |
| 2004/0073926 A1 | 4/2004 | Nakamura et al. |
| 2004/0101059 A1 | 5/2004 | Joch et al. |
| 2004/0184532 A1 | 9/2004 | Juri et al. |
| 2004/0208389 A1 | 10/2004 | Lin |
| 2004/0264795 A1 | 12/2004 | Fielding |
| 2006/0007460 A1 | 1/2006 | Bogdanowicz et al. |
| 2006/0013320 A1 | 1/2006 | Oguz et al. |
| 2006/0072660 A1 | 4/2006 | Jia et al. |
| 2006/0082649 A1 | 4/2006 | Gomila et al. |
| 2006/0083316 A1 | 4/2006 | Cooper et al. |
| 2006/0083426 A1 | 4/2006 | Cooper et al. |
| 2006/0083429 A1 | 4/2006 | Joly |
| 2006/0104366 A1 | 5/2006 | Huang et al. |
| 2006/0133686 A1 | 6/2006 | Gomila et al. |
| 2006/0182183 A1 | 8/2006 | Winger |
| 2006/0183275 A1 | 8/2006 | Schoner et al. |
| 2006/0256853 A1 | 11/2006 | Schlockerman et al. |
| 2006/0256871 A1 | 11/2006 | Boyce et al. |
| 2006/0291557 A1 | 12/2006 | Tourapis |
| 2007/0002947 A1 | 1/2007 | Lu et al. |
| 2007/0030996 A1 | 2/2007 | Winger et al. |
| 2007/0036452 A1 | 2/2007 | Llach et al. |
| 2007/0047658 A1 | 3/2007 | Tourapis et al. |
| 2007/0058866 A1 | 3/2007 | Boyce et al. |
| 2007/0058878 A1 | 3/2007 | Gomila et al. |
| 2007/0070241 A1 | 3/2007 | Boyce et al. |
| 2007/0104380 A1 | 5/2007 | Gomila et al. |
| 2007/0140588 A1 | 6/2007 | Balram et al. |
| 2007/0297515 A1 | 12/2007 | Gomila et al. |
| 2008/0252781 A1 | 10/2008 | DeWaele et al. |
| 2010/0104025 A1 | 4/2010 | Rose et al. |

FOREIGN PATENT DOCUMENTS

| | | |
|---|---|---|
| EP | 0622000 | 10/1992 |
| EP | 0756281 A | 1/1997 |
| EP | 1216624 | 6/1997 |
| EP | 0575006 | 10/1999 |
| EP | 622000 | 3/2000 |
| EP | 1175091 | 1/2002 |
| EP | 1215624 | 6/2002 |
| EP | 1511320 | 3/2005 |
| GB | 2312124 | 10/1997 |
| JP | 1156069 | 6/1989 |
| JP | 04097881 | 3/1992 |
| JP | 04349458 | 12/1992 |
| JP | 5252459 | 9/1993 |
| JP | 08079765 | 3/1996 |
| JP | 8149466 | 6/1996 |
| JP | 9062718 | 3/1997 |
| JP | 9139940 | 5/1997 |
| JP | 9247681 | 9/1997 |
| JP | 10509297 | 9/1998 |
| JP | 200041242 | 8/2000 |
| JP | 2001357090 | 12/2001 |
| JP | 2001357095 | 12/2001 |
| JP | 2002369846 | 12/2002 |
| JP | 2002374541 | 12/2002 |
| JP | 200324326 | 1/2003 |
| JP | 2003163853 | 6/2003 |
| JP | 2003179923 | 6/2003 |
| JP | 2004120057 | 4/2004 |
| JP | 2004135169 | 4/2004 |
| JP | 2007529945 | 10/2007 |
| RU | 2073913 | 2/1997 |
| RU | 2088962 | 8/1997 |
| RU | 2139637 | 10/1999 |
| WO | WO9206409 | 4/1992 |
| WO | WO9314591 | 7/1993 |
| WO | WO9341691 | 7/1993 |
| WO | WO9520292 | 7/1995 |
| WO | WO 97/10676 | 3/1997 |
| WO | WO9710676 | 3/1997 |
| WO | WO9722204 | 6/1997 |
| WO | WO-9841026 | 9/1998 |
| WO | WO00/18109 | 3/2000 |

| WO | WO0146992 | 6/2001 |
| --- | --- | --- |
| WO | WO0174064 | 10/2001 |
| WO | WO0177871 | 10/2001 |
| WO | WO0233958 | 4/2002 |
| WO | WO-0251160 | 6/2002 |
| WO | WO03005731 | 1/2003 |
| WO | WO-2004034518 | 4/2004 |
| WO | WO2004095829 | 11/2004 |
| WO | WO2004104931 | 12/2004 |
| WO | WO-2004105250 | 12/2004 |
| WO | WO2005/027045 | 3/2005 |
| WO | WO-2005032143 | 4/2005 |
| WO | WO2005034518 | 4/2005 |
| WO | WO-2005039188 | 4/2005 |
| WO | WO2005039189 | 4/2005 |
| WO | WO-2006022705 | 3/2006 |
| WO | WO2006/057703 | 6/2006 |

OTHER PUBLICATIONS

Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
Schlockermann M. et. al., Film Grain Coding in H.264/AVC, Joint Video Team (JVT) of (ISO/IEC MPEG & ITU-T VCEG, JVT-1034D2) 9$^{th}$ Meeting Sep. 2-5, 2003, San Diego XP-002311238.
Xuemin Chen:"Transporting Compressed Digital Video, Chapter 5: Time Stamping for Decoding and presentation" 2002,Kluwer Academic Pub., Boston,Dordrecht, London, p. 133-136.
Gomila et al., "SEI Message for Film Grain Encoding: Syntax and Results". JVT of ISO/IEC MPEG & ITU-T VCEG, (ISO/IEC JTC1/SC-29/WG11 and ITU-T SG16 Q.6), 7th Meeting: San Diego, CA, Sep. 2-5, 2003.
Puri A et al: "Video Coding using the H.264/MPEG-4 AVC compression standard" Signal Processing, Image Communication, Elsevier Science Publishers, Amsterdam, NL vol. 19,, No. 9, Oct. 1, 2004 pp. 793-849 ISSN: 0923-5965, section 8.3 "Trick Modes for PVR".
Wiegand et al: "Film Grain Coding in H.264/AVC," JVT of ISO/IEC MPEG & ITU-T VCEG (ISO/IEC JTC1/SC29/29/WG11 and ITU-T SG16 Q.6) 9th Meeting:Sep. 2-5, 2003, San Diego, CA.
Search Report dated May 5, 2006.
Gomila et al: "SEI Message for Film Grain Encoding", May 23-27, 2003, JVT of ISO/IEC MPEG & ITU-T VCEG (ISO/IEC JTC1/SC29/WG11 and ITU-T SG16 Q.6) 8$^{th}$ Meeting: Geneva, CH, May 23-27, 2003.
Conklin et al: "Dithering 5-Tap Filter for Inloop Deblocking",JVT of ISO/IEC MPEG & ITU-T VCEG (ISO/IEC JTC/SC29/WG11 and ITU-T SG16 Q.6) 3rd Meeting: Fairfax, Virginia, USA, May 6-10, 2002.
Mc Mahon, T. et al: "High Quality SD and HD AVC Test Results" JVT Team of ISO/IEC MPEG & ITU-T VCEG (ISO/IEC JTC1/SC29/WG11 and ITU-T SG16 Q.6) 5$^{th}$ Meeting: Geneva, CH Oct. 9-17, 2002.
Naderi, F. et al: "Estimation of Images Degraded by Film Grain Noise" Applied Optics, vol. 17, Issue 8, pp. 1228-1237. Jan. 1, 1998.
Bjontegaard, G: Addition of Comfort Noise as Post Processing ITU-Telecommunications Standardization Sector, Study Group 16, 2$^{nd}$ Meeting, Subnriver, Oregon. Sep. 8-11, 1997.
Schaar et al: "Fine Granularity Scalability for Wireless Video and Scalable Storage", Visual Communications and Image Processing 2002, Proceedings of SPIE, vol. 4671 (2002) SPIE 0277-786X/02.
Illingworth et al: "Vision, Image and Signal Processing" The Institute of Electrical Engineers. IEE Proceedings, Jun. 2000, vol. 147, No. 3.

Office Action from U.S. Appl. No. 10/522,179 mailed Sep. 1, 2010.
Office Action from U.S. Appl. No. 10/556,833 mailed May 10, 2010.
Office Action from U.S. Appl. No. 10/556,833 mailed Oct. 20, 2010.
Office Action ADV Action from U.S. Appl. No. 10/556,833 mailed Jan. 7, 2011.
Office Action from U.S. Appl. No. 10/556,833 mailed Feb. 15, 2011.
Office Action from U.S. Appl. No. 10/556,833 mailed May 10, 2011.
Office Action from U.S. Appl. No. 10/556,833 mailed Sep. 30, 2011.
Final Office Action from U.S. Appl. No. 10/571,148 mailed May 12, 2010.
Office Action from U.S. Appl. No. 10/571,148 mailed Sep. 10, 2010.
Office Action from U.S. Appl. No. 10/572,820 mailed Mar. 19, 2010.
Office Action from U.S. Appl. No. 10/572,820 mailed May 11, 2010.
Final Office Action from U.S. Appl. No. 10/572,820 mailed Sep. 30, 2010.
Final Office Action from U.S. Appl. No. 10/575,676 mailed Mar. 4, 2010.
Office Action from U.S. Appl. No. 10/575,676 mailed Jul. 19, 2011.
Final Office Action from U.S. Appl. No. 10/575,676 mailed Oct. 28, 2011.
Office Action ADV Action from U.S. Appl. No. 10/575,676 mailed Jun. 7, 2010.
Final Office Action from U.S. Appl. No. 11/246,848 mailed Jul. 6, 2010.
Final Office Action from U.S. Appl. No. 11/246,848 mailed Oct. 13, 2010.
Final Office Action from U.S. Appl. No. 11/273,067 mailed Aug. 4, 2010.
Office Action from U.S. Appl. No. 11/284,378 mailed Dec. 22, 2010.
Office Action from U.S. Appl. No. 11/285,540 mailed Nov. 23, 2010.
Office Action from U.S. Appl. No. 11/285,540 mailed Mar. 30. 2011.
Office Action from U.S. Appl. No. 11/667,581 mailed Jun. 8, 2011.
Final Office Action from U.S. Appl. No. 11/667,581 mailed Oct. 14, 2011.
Office Action from U.S. Appl. No. 11/667,629 mailed Jul. 9, 2010.
Final Office Action from U.S. Appl. No. 11/667,629 mailed Nov. 19, 2010.
Office Action from U.S. Appl. No. 11/667,629 mailed Jan. 13, 2011.
Final Office Action from U.S. Appl. No. 11/667,629 mailed Apr. 22, 2011.
Office Action from U.S. Appl. No. 11/667,816 mailed Sep. 15, 2011.
Office Action from U.S. Appl. No. 11/667,816 mailed Dec. 5, 2011.
Office Action from U.S. Appl. No. 11/667,846 mailed Oct. 4, 2011.
Office Action from U.S. Appl. No. 12/589,217 mailed Jul. 13, 2010.
Final Office Action from U.S. Appl. No. 12/589,217 mailed Oct. 28. 2010.
Office Action ADV Action from U.S. Appl. No. 12/589,217 mailed Dec. 2, 2010.
McLean, I, et al., "Telecine Noise Reduction", IEE Seminar Digital Restoration of Film and Video Archives (Ref. No. 01/049), IEE Seminar Digital Restoration of Film and Video Archives, London, UK. Jan. 16, 2001, pp. 2/1-2/6.
Yan, Jacky Chun Kit, et al. "Film Grain Noise Removal and Generation for Color Images", 1997 IEEE Signal Processing Workshop on Higher-Order Statistics, Jul. 21-23, Banff, Alberta, Canada. pp. 73-76.
Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.
Al-Shaykh, Osama K., et al., "Restoration of Lossy Compressed Noisy Images", IEEE Transactions of Image Processing, vol. 8. No. 10, pp. 1348-1360, Oct. 1999.
Al-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.
Campisi, P, et al. "Signal-dependent film grain noise generation using homomorphic adaptive filtering.", IEE Proceedings Vision, Image and Signal Processing, vol. 147, No. 3 pp. 283-287 Jun. 2000.
Yoshida, J, "Go with the Grain, Film R&D Chief Urges, for Art's Sake", EETimes, http://www.eetimes.com/showArticle.jhtml?articleID=59301182 (last checked Jul. 23, 2007).

Zhao, Lifeng, et al., "Constant Quality Rate Control for Streaming MPEG-4 FGS Video", IEEE, 2002, pp. 544-547.

Brightwell, PJ, et al., "Automated Correction of Film Unsteadiness, Dirt and Grain". International Broadcasting Convention, Sep. 16-20, 1994 Conference Publication, No. 397.

Oktem, R, et al., "Transform Domain Algorithm for Reducing Effect of Film Grain Noise in Image Compression", Electronics Letters, vol. 35, No. 21, Oct. 14, 1999, pp. 1830-1831.

Fischer, Marco, et al., "Image Sharpening Using Permutation Weighted Medians", Dept of Electrical Engineering, University of Delware Newark, DE, pp. 1-4, provided Aug. 13, 2007.

Shahnaz, Rubeena, et al., "Image Compression in Signal-Dependent Noise". Applied Optics, vol. 38, No. 26. Sep. 10, 1999, pp. 5560-5567.

Chavel, P., et al., "Film Grain Noise in Partially Coherent Imaging", Optical Engineering, vol. 19, No. 3, May/Jun. 1980, pp. 404-410.

Zhang, Xi Min, et al., "Constant Quality Constrained Rate Allocation for FGS Video Coded Bitstreams", Proceedings of SPIE, vol. 4671, pp. 817-827, 2002.

Peng, Sharon, et al., Adaptive Frequency Weighting for Fine-Granularity-Scalability, Proceedings of SPIE, vol. 4671, pp. 840-849, 2002.

Van Der Schaar, M., et al., "Fine-Granularity for Wireless Video and Scalable Storage", Proceedings of SPIE vol. 4671, pp. 805-816, 2002.

Prades-Nebot, Josep, et al., "Rate Control for Fully Fine Grained Scalable Video Coders", Proceedings of SPIE, vol. 4671, pp. 828-839, 2002.

Yan, Rong, et al., "Efficient Video Coding with Hybrid Spatial and Fine Grain SNR Scalabilities", Proceedings of SPIE vol. 4671, pp. 850-859, 2002.

* cited by examiner

| FILM GRAIN SEI | FG1 | | | | | | | | | | | FG2 | | |
|---|---|---|---|---|---|---|---|---|---|---|---|---|---|---|
| DECODE ORDER | I2 | B0 | B1 | P5 | B3 | B4 | P8 | B6 | B7 | P11 | B9 | B10 | I2 | |
| DISPLAY ORDER | B10 | P11 | B0 | B1 | I2 | B3 | B4 | P5 | B6 | B7 | P8 | B9 | B10 | B0 B1 I2 |

NORMAL PLAYBACK, USE SEI IN DECODE ORDER

FRAMES USING FG1 — FRAMES USING FG2

FIG. 4

| FILM GRAIN SEI | FG1 | | | | | | | | | | | FG2 | | |
|---|---|---|---|---|---|---|---|---|---|---|---|---|---|---|
| DECODE ORDER | I2 | B0 | B1 | P5 | B3 | B4 | P8 | B6 | B7 | P11 | B9 | B10 | I2 | |
| DISPLAY ORDER | B0 | B1 | I2 | B3 | B4 | P5 | B6 | B7 | P8 | B9 | B10 | P11 | B0 B1 I2 | |

JUMP TO B0 EXAMPLE, CONSISTENT RESULT WITH NORMAL PLAY MODE

FRAMES USING FG1 — FRAMES USING FG2

FIG. 5

| FILM GRAIN SEI | FG1 | | | | | | | | | | | FG2 | |
|---|---|---|---|---|---|---|---|---|---|---|---|---|---|
| DECODE ORDER | I3 | B0 | B1 | B2 | P7 | B4 | B5 | B6 | P11 | B8 | B9 | B10 | I3 |
| DISPLAY ORDER | B10 | P11 | B0 | B1 | B2 | I3 | B4 | B5 | B6 | P7 | B8 | B9 | B10 P11 B0 B1 B2 I3 |

NORMAL PLAYBACK, CASE OF 3 B FRAMES

FRAMES USING FG1 — FRAMES USING FG2

FIG. 6

| FILM GRAIN SEI | FG1 | | | | | FG2 | |
|---|---|---|---|---|---|---|---|
| DECODE ORDER | I3 | B1 | P7 | B5 | P11 | B9 | I3 |
| DISPLAY ORDER | B10 | P11 | B1 | I3 | B5 | P7 | B9 P11 B1 I3 |

2X TRICK MODE, DECODE ORDER STILL USED

FRAMES USING FG1 — FRAMES USING FG2

FILM GRAIN SIMULATION FOR NORMAL PLAY AND TRICK MODE PLAY FOR VIDEO PLAYBACK SYSTEMS

CROSS-REFERENCE TO RELATED APPLICATIONS

This application claims the benefit of U.S. Provisional Application Ser. No. 60/627,756, filed 12 Nov. 2004, which is incorporated by reference herein in its entirety.

FIELD OF THE INVENTION

The present invention relates generally to video encoders and video decoders and, more particularly, to film grain simulation for normal play and for trick mode play for video playback systems.

BACKGROUND OF THE INVENTION

Film grain forms in motion picture images during the process of development. Film grain is clearly noticeable in high definition (HD) images and becomes a distinctive cinema trait that should be preserved through the whole image processing and delivery chain. Nevertheless, film grain preservation is a challenge for current encoders since compression gains related to temporal prediction cannot be exploited. Due to the random nature of the grain, visually lossless encoding is only achieved at very high bit-rates. Lossy encoders tend to suppress the film grain when filtering the high frequencies typically associated with noise and fine textures.

Film Grain Management (FGM, also referred to herein as Film Grain Technology, or FGT) has been presented as a new way of encoding the grain in motion picture film by means of a parameterized model to be transmitted as parallel information. To support FGT, the Fidelity Range Extension (FRExt) Amendment to the ITU-T Rec. H.264 | ISO/IEC 14496-10 | MPEG-4 AVC | Joint Video Team (JVT) standard (hereinafter the "H.264 standard") has defined a film grain characteristics Supplemental Enhancement Information (SEI) message. The SEI message describes the film grain characteristics regarding attributes such as size and intensity, and allows a video decoder to simulate the film grain look onto the decoded picture. The H.264 standard specifies which parameters are present in the film grain characteristics SEI message, how to interpret the parameters, and the syntax for encoding the SEI message in binary format. However, the H.264 standard does not specify the exact procedure to simulate film grain upon reception of the film grain characteristics SEI message. It is to be appreciated that FGT can be used jointly with any other video coding method since it utilizes parallel information, transmitted from an encoder, that does not affect the decoding process.

In FGT, the encoder models the film grain of the video sequence and the decoder simulates the film grain according to the received information. The encoder can use FGT to enhance the quality of the compressed video when there is difficulty retaining the film grain. Additionally, the encoder has the option of removing or attenuating the grain prior to encoding in order to reduce the bit-rate.

Film grain simulation aims at synthesizing film grain samples that simulate the look of original film content. Unlike film grain modeling, which is entirely performed at the encoder, film grain simulation is performed at the decoder. Film grain simulation is done after decoding the video stream and prior to display. Images with added film grain are not used within the decoding process. Being a post-processing method, synthesis of simulated film grain on the decoded images for the display process is not specified in the H.264 standard. The film grain simulation process includes the decoding of film grain supplemental information, transmitted in a film grain characteristics SEI message as specified by the Fidelity Range Extensions Amendment of the H.264 standard.

Thus, it is to be appreciated that film grain simulation is a relatively new technology used in post-production to simulate film grain on computer-generated material, as well as during restoration of old film stocks. For these types of applications, there exists commercial software in the market like Cineon®, from Eastman Kodak Co, Rochester, N.Y., and Grain Surgery™, from Visual Infinity. These tools generally operate based on user interaction and are complex to implement, which makes them unsuitable for real-time video coding applications. Furthermore, none of these tools has the capability to interpret a film grain characteristics SEI message as specified by the H.264 standard.

Based on the aforementioned Supplemental Enhancement Information (SEI) message, several prior art approaches have been developed relating to specifications for simulating film grain. These prior art approaches target high quality applications and provide large flexibility in the simulation of different film grain patterns on both luma and chroma color components with a small increase in computational cost. However, during trick mode play, like fast forward or jumps, these prior art approaches consider several special cases that undesirably add additional complexity and result in inconsistent film grain simulation.

Accordingly, it would be desirable and highly advantageous to have methods and apparatus for bit-accurate film grain simulation for normal play and trick mode for standard definition (SD) and high definition (HD) DVD systems that is more efficient to implement than related prior art approaches while maintaining a consistent film grain simulation unlike the related prior art approaches.

SUMMARY OF THE INVENTION

These and other drawbacks and disadvantages of the prior art are addressed by the present invention, which is directed to bit-accurate film grain simulation for normal play and trick mode for video playback systems.

According to an aspect of the present invention, there is provided a method for simulating film grain in video. The method includes the step of performing film grain simulation on a sequence of decoded video pictures in decode order.

According to another aspect of the present invention, there is provided a method for managing a pseudo random number generator (PRNG). The method includes the step of resetting at least one default value of the PRNG at a DVD playback mechanism reset condition.

According to yet another aspect of the present invention, there is provided a method for simulating film grain in video using a pseudo random number generator (PRNG). The method includes the steps of obtaining a PRNG seed at a beginning of a given frame in a sequence of decoded frames, and applying the same PRNG seed for the same given frame in the sequence during a pause thereof.

According to still yet another aspect of the present invention, there is provided an apparatus for simulating film grain in video. The apparatus includes a film grain simulator for performing film grain simulation on a sequence of decoded pictures in decode order.

According to a further aspect of the present invention, there is provided an apparatus for managing a pseudo random number generator (PRNG). The apparatus includes a film grain simulator for resetting at least one default value of the PRNG at a DVD playback mechanism reset condition.

According to an additional aspect of the present invention, there is provided an apparatus for simulating film grain in video using a pseudo random number generator (PRNG). The apparatus includes a film grain simulator for obtaining a PRNG seed at a beginning of a given frame in a sequence of decoded frames, and for applying the same PRNG seed for the same given frame in the sequence during a pause thereof.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to bit-accurate film grain simulation for normal play and trick mode for video playback systems. Advantageously, the present invention provides a more efficient implementation of the film grain process than the prior art, particularly during trick modes such as, e.g., fast forward or jumps.

It is to be appreciated that, given the teachings of the present invention provided herein, the present invention can be applied jointly with any other video coding standard having the capability of conveying required set of film grain parameters, either in-band or out of band.

It is to be further appreciated that the present invention may be employed with many types of video playback systems including, but not limited to, digital video disk (DVD) systems, personal video recorders (PVRs), and so forth. Moreover, the present invention may be employed in standard definition (SD) and high definition (HD) playback systems. Further, as noted above the present invention may be utilized in both normal play and trick mode play implementations. Trick mode play includes, but is not limited to, fast forward/reverse, slow forward/reverse, step forward/reverse, search time leap, zoom and pan, and angle control.

Film grain characterization may occur through a modeling process. The modeling process seeks to reduce the amount of film grain characterization information to be transmitted by providing a compact representation of the film grain pattern and intensity. Such an approach provides an estimate of the original film grain, which can differ from the actual film depending on the selected modeling process. When the system that models the film grain at an encoder is enabled to select among more than one modeling methods to characterize the film grain of the incoming images, a decoder should receive at least some information identifying the modeling method that was selected. In a particular embodiment, the modeling process could provide a compact representation of the film grain according to a non-parametric model. In another embodiment, the modeling process could consist in a parameterization process according to a pre-defined mathematical model. To illustrate this last embodiment, Table 1 provides an example of several different mathematical models could be used to describe film grain.

TABLE 1

| Identifier | Film grain model |
|---|---|
| 0 | $f(x, y, c) = d * n$ |
| 1 | $f(x, y, c) = s(x, y, c) + k*s(x, y, c) + d * n$ |
| 2 | $f(x, y, c) = a * f(x - 1, y - 1, c) + b*f(x, y, c - 1) + d*n$ |
| 3 | $f(x, y, c) = a * r(x, y, c) - b*s(x, y, c) + d*n$ |
| ... | |
| N | $f(x, y, c) = a*[ d(x - 1, y, c) + f(x, y - 1, c)] + b*f(x, y, c - 1) + d*n$ |

The use of parametric models requires the transmission of the estimated set of parameters. The parameters will depend on the type of model as specified in Table 1, or in the simplest case, will correspond to a unique film grain model known a priori from the type of film. The parameters of a given film grain model should allow adjustment of the size of the film grain, its intensity, its spatial correlation, its color correlation, etc. As an example, assume the following formula serves to model the film grain in an image:

$$f(x,y,c)=a*[f(x-1,y,c)+f(x,y-1,c)]+b*f(x,y,c-1)+d*n$$

where f(x,y,c) represents the film grain of the pixel at coordinates (x,y) on the color component c, and n represents a Gaussian noise of mean zero and variance one. According to this model, an encoder should transmit the parameters 'a', 'b' and 'd' to allow a decoder to simulate the original film grain. Note that the parameters of the model could depend on other factors, such as signal intensity, the color component, etc. Hence, transmission of the film grain model parameters actually entails transmission of sets of model parameters for each different case.

In some cases film grain characterization can involve color conversion and/or pixel sample interpolation depending on the original file format. For high quality applications, film grain modeling occurs in the RGB color space, which better approximates the layer configuration of the physical process of film developing. The simplest parametric model can assume the film grain to be a Gaussian noise of zero mean uncorrelated with the image signal. In this case, only the transmission of the standard deviation of the Gaussian function is required. More complicated models can require the transmission of different parameters for each color component and/or for different gray level sets. The choice of a model can be strongly related to the affordable complexity at the decoder side, the number of bits available for encoding the SEI message and mainly the desired quality on display.

As discussed, film grain simulation can rely on a pre-defined model, which reproduces the film grain of a specific type of film, or can occur by parameterization using a mathematic model. Film grain restoration occurs prior to display. Images with added film grain are never used within the decoding process; however, some parallelization could be possible for causal models.

Film grain simulation is performed after decoding the video bit-stream and prior to pixel display. The film grain simulation process may involve the decoding of film grain supplemental information transmitted, e.g., in a film grain characteristics SEI message as specified by the FRExt Amendment to the H.264 standard. In such a case, the present invention advantageously provides specifications directed to the film grain characteristics SEI message to ensure the involved devices meet the requirements of standard definition and high definition systems in terms of quality and complexity.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

As noted above, the present invention is directed to bit-accurate film grain simulation for normal play and trick mode play for standard definition (SD) and high definition (HD) DVD systems. The present invention may be considered as an addendum to the film grain characteristics SEI message, as described by the H.264 standard.

Figure 1:
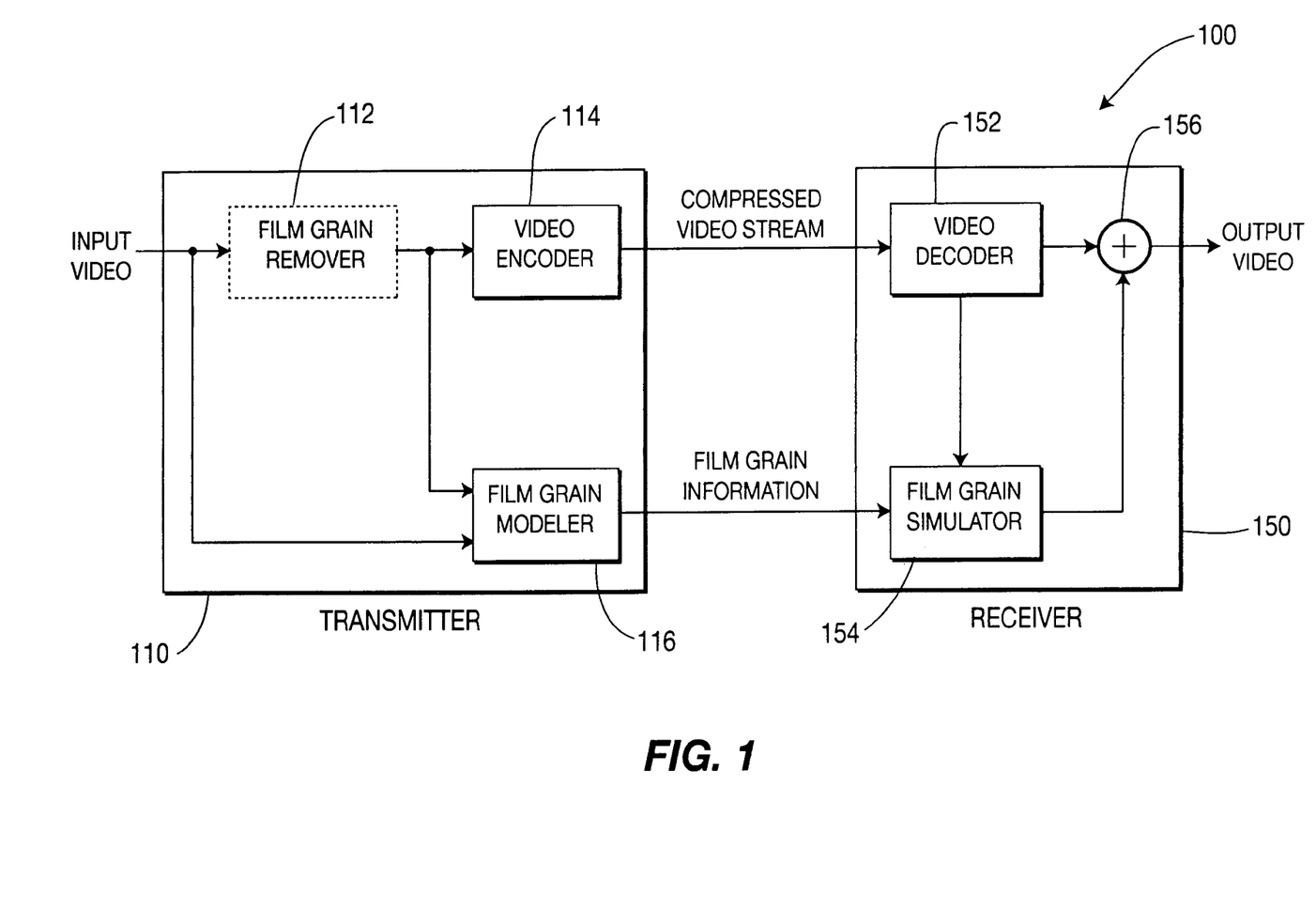
FIG. 1 is a block diagram illustrating a Film Grain Technology (FGT) processing chain to which the present invention may be applied.

Turning to FIG. 1, a Film Grain Technology (FGT) processing chain to which the present invention may be applied is indicated generally by the reference numeral 100. The FGT processing chain includes a transmitter 110 and a receiver 150. The transmitter may include a film grain remover 112, a video encoder 114, and a film grain modeler 116. The receiver includes a video decoder 152, a film grain simulator 154, and a combiner 156 (such as the summation node shown).

An input to the transmitter 110 is connected in signal communication with an input of the film grain remover 112 and a first input of the film grain modeler 116. An output of the film grain remover 112 is connected in signal communication with an input of the video encoder 114 and a second input of the film grain modeler 116. If the film grain remover 112 is not present, the transmitter 110 is connected in signal communication with an input of the video encoder 114. An output of the video encoder 114 is available as a first output of the transmitter 110. An output of the film grain modeler 116 is available as a second output of the transmitter 110. The first output of the transmitter 110 is connected in signal communication with a first input of the receiver 150. The second output of the transmitter 110 is connected in signal communication with a second input of the receiver 150. The first input of the receiver 150 is connected in signal communication with an input of the video decoder 152. The second input of the receiver 150 is connected in signal communication with a first input of the film grain simulator 154. A first output of the video decoder 152 is connected in signal communication with a second input of the film grain simulator 154. A second output of the video decoder 152 is connected in signal communication with a first input of the combiner 156. An output of the film grain simulator is connected in signal communication with a second input of the combiner 156. An output of the combiner 156 is available as an output of the receiver 150.

Trick modes are defined to include, for example, jumps or skipping of frames in forward or reverse order. The following specifications in accordance with the present invention are proposed with respect to trick mode (and also normal play) in a standard definition (SD) or a high definition (HD) playback system: (1) Film grain characteristics SEI messages are applied in decoding order; (2) the pseudo random number generator (PRNG) is reset to default values at any playback mechanism reset condition including, but not limited to, power off; (3) the seed of the PRNG has the same starting value at the beginning of a frame (in a sequence of decoded frames) during a pause as that used at the beginning of that same frame in normal play. It is to be appreciated that the application of film grain characteristics SEI messages in decode order allows a consistent definition for film grain simulation during normal play and trick mode play.

Figure 2A:
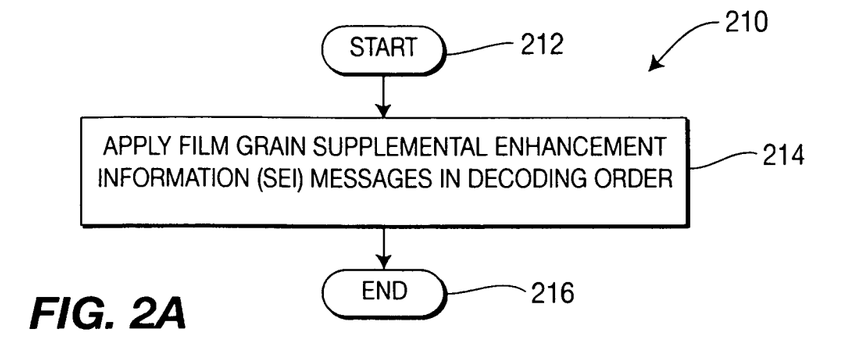
FIG. 2A is a flow diagram illustrating a method for film grain simulation in decode order for normal play and trick mode play for a Standard Definition (SD) or High Definition (HD) video playback system in accordance with the principles of the present invention.

Turning to FIG. 2A, a bit-accurate method for film grain simulation in decode order for normal play and trick mode play for a standard definition (SD) or high definition (HD) video playback system is indicated generally by the reference numeral 210. It is to be appreciated that the method 210 of FIG. 2A provides a consistent definition for film grain simulation during normal play and trick mode play.

The method includes a start block 212 that passes control to a function block 214. The function block 214 specifies that film grain characteristics Supplemental Enhancement Information (SEI) messages are applied in decoding order, and passes control to an end block 216.

Figure 2B:
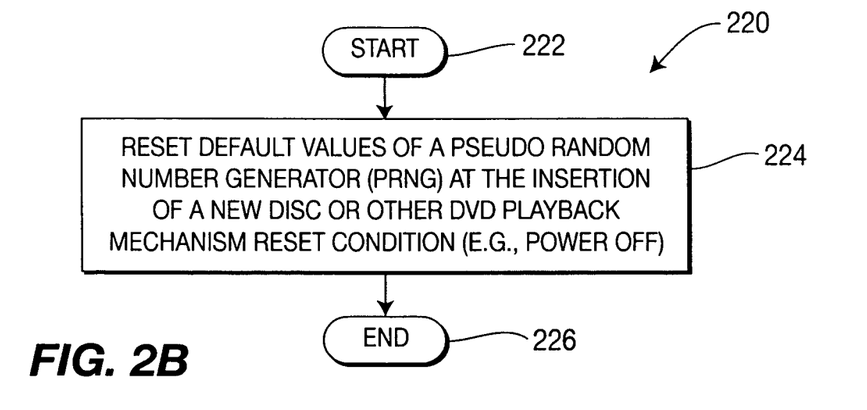
FIG. 2B is a flow diagram illustrating a method for managing a pseudo random number generator (PRNG) seed used for film grain simulation in accordance with the principles of the present invention.

Turning to FIG. 2B, a bit-accurate method for managing a pseudo random number generator (PRNG) seed used for film grain simulation is indicated generally by the reference numeral 220. It is to be appreciated that the method 220 of FIG. 2B provides a consistent film grain simulation irrespective of the play mode (i.e., consistent film grain simulation with respect to both normal play and trick mode play).

The method includes a start block 222 that passes control to a function block 224. The function block 224 specifies that default values of a pseudo random number generator (PRNG) (used for film grain simulation) are reset at the insertion of a new disc or other playback mechanism reset condition including, but not limited to, power off, and passes control to an end block 226.

Figure 2C:
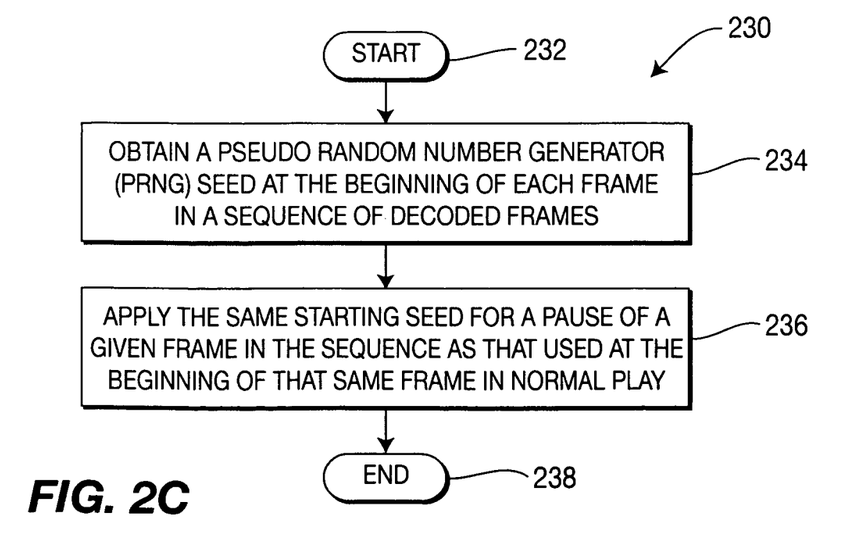
FIG. 2C is a flow diagram illustrating a bit-accurate method for simulating film grain for normal play and trick mode for a Standard Definition (SD) or a High Definition (HD) video playback system in accordance with the principles of the present invention.

Turning to FIG. 2C, a bit-accurate method for simulating film grain for normal play and trick mode for a standard definition (SD) or a high definition (HD) video playback system is indicated generally by the reference numeral 230. The method 230 is presumed to simulate film grain using a pseudo random number generator (PRNG). It is to be appreciated that the method 230 of FIG. 2C provides a consistent film grain simulation irrespective of the play mode (i.e., consistent film grain simulation with respect to both normal play and trick mode play).

The method includes a start block 232 that passes control to a function block 234. The function block 234 specifies that the seed of the PRNG is obtained at the beginning of each frame in a sequence of decoded frames, and passes control to a function block 236. The function block 236 specifies that the seed of the PRNG has the same starting value at the beginning of a frame during a pause as that used at the beginning of that same frame in normal play (referred to by function block 234). When the pause finishes, control is passed to an end block 238.

Figure 3:
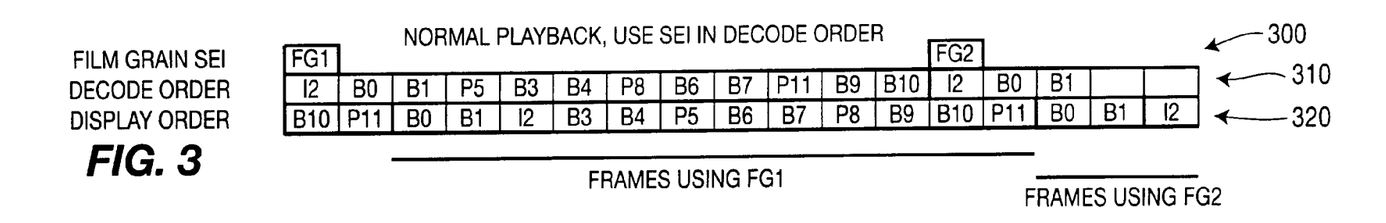
FIG. 3 is a diagram illustrating an example of film grain simulation in normal playback that uses Supplemental Enhancement Information (SEI) in decode order in accordance with the principles of the present invention.

Turning to FIG. 3, an example of film grain simulation in normal playback that uses Supplemental Enhancement Information (SEI) in decode order is indicated generally by the reference numeral 300. In particular, FIG. 3 illustrates a closed Group of Pictures (GOP) example expected to be typical in HD DVD format. The top row lists the frames from left to right in decode order 310, and the bottom row lists these frames from left to right in display order 320.

In these examples, film grain SEI messages are sent accompanying each I picture, as illustrated in the upper line of each figure. Thick boxes around pictures denote the persistence of an SEI message; for example, in FIG. 3, decode order, the film grain SEI message FG1 sent with picture I2 is used in all following pictures until picture B10 is reached (inclusive). Horizontal lines below (display order) pictures denote the film grain parameters (FGn) used with these pictures; for example, in FIG. 3, film grain parameters FG1 are used from the first B0 picture until P11 picture (inclusive). This is to say that SEI messages will apply to all frames following an I picture in decoding order until the next I picture is reached.

During normal playback, the B0 frame would be suitable for a scene change point, since the SEI message parameters can change on this boundary. This is consistent with using the B0 for scene change normally.

Figure 4:
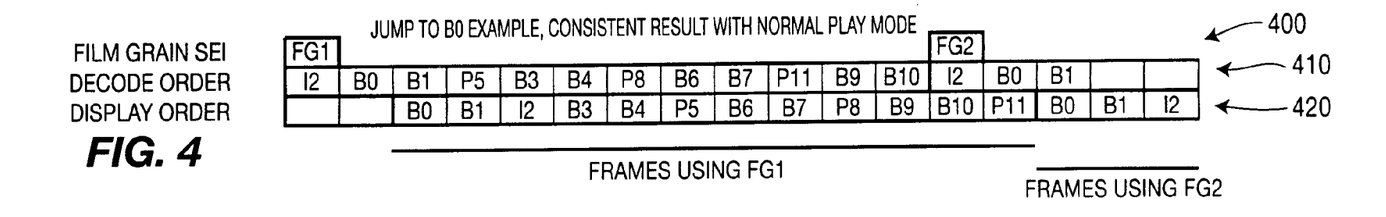
FIG. 4 is a diagram illustrating an example of film grain simulation in trick mode play in accordance with the principles of the present invention.

Turning to FIG. 4, an example of film grain simulation in trick mode play is indicated generally by the reference numeral 400. In particular, FIG. 4 illustrates a jump to picture B0. The top row lists the frames from left to right in decode order 410, and the bottom row lists these frames from left to right in display order 420. The decode order application of the film grain characteristics SEI messages results in a consistent application of Film Grain Technology compared to normal play.

Figure 5:
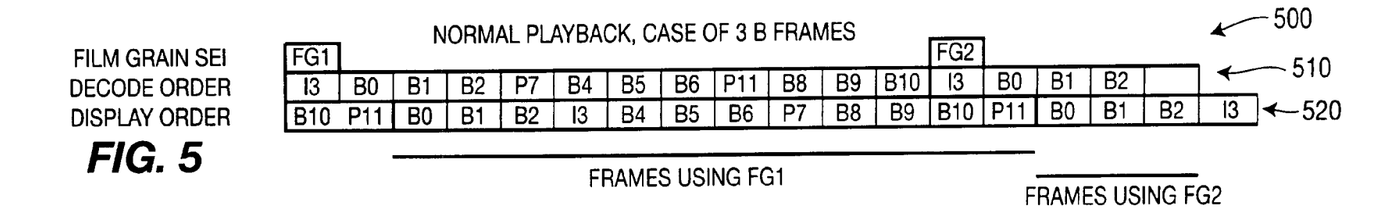
FIG. 5 is a diagram illustrating an example of film grain simulation in normal playback in accordance with the principles of the present invention.
Figure 6:
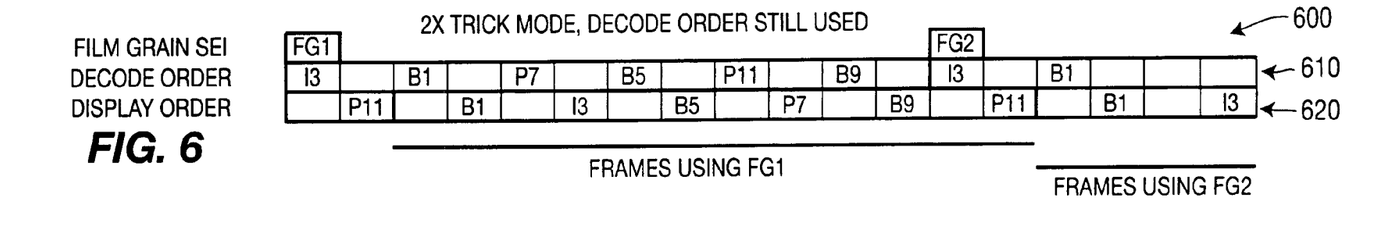
FIG. 6 is a diagram illustrating an example of film grain simulations in fast forward trick mode in accordance with the principles of the present invention.

Turning to FIGS. 5 and 6, examples of film grain simulations in normal playback and fast forward trick mode are indicated generally by the reference numerals 500 and 600, respectively. In particular, FIGS. 5 and 6 both illustrate a Group of Pictures (GOP) structure with 3 B frames, with FIG. 6 illustrating a 2× fast forward trick mode. The top rows list the frames from left to right in decode order 510 and 610, and the bottom rows list these frames from left to right in display order 520 and 620. The decode order application of the film grain characteristics SEI message results in a consistent application of Film Grain Technology during this trick mode example (FIG. 6) compared to normal play (FIG. 5).

For Intra frame only trick modes, the specification described herein in accordance with the principles of the present invention supports the consistent application of film grain characteristics SEI messages. It is to be noted that since the pseudo random number generator may, in some embodiments, only be initialized during a HD DVD player device reset condition, the simulated film grain pattern is still random and consistent.

During a pause, the picture must remain fixed (the film grain simulation should remain consistent). Therefore, the seed of the PRNG shall have the same starting value at the beginning of a frame during a pause as that used at the beginning of that same frame in normal play. In one illustrative embodiment, the pseudo random number generator (PRNG) seed at the beginning of a given frame is stored in case the PRNG seed is to be applied for a pause. Accordingly, a 32 bit register may be employed in such hardware implementations.

Thus, it is to be noted that the illustrative examples provided herein utilize the described GOP structures and corresponding usage in a HD DVD system. However, it is to be appreciated that, given the teachings of the present invention provided herein, these and other structures and corresponding usages may also be employed in accordance with the principles of the present invention while maintaining the spirit of the present invention. Advantageously, the specifications described herein support a consistent rule for applying film grain characteristics Supplemental Enhancement Information (SEI) messages for normal play and trick mode play. Implementation of FGT in accordance with the principles of the present invention will advantageously provide a consistent viewing experience independent of any trick modes applied by the consumer.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for simulating film grain in video in a video receiver, comprising the steps of
  receiving film grain information in a supplemental information message charactering film grain in an original video image;
  decoding the received film grain information
  performing (214) film grain simulation within a film grain simulator within the video receiver on a sequence of decoded video pictures in accordance with the decoded film grain information applied in decode order to the sequence of decoded video pictures.

2. The method of claim 1, wherein the simulating of film grain is bit accurate.

3. The method of claim 1, wherein the simulating of film grain is consistent irrespective of play mode.

4. The method of claim 3, wherein the play mode is trick play.

5. A method for managing a pseudo random number generator (PRNG), comprising the steps of:
  resetting (224) at least one default value of the PRNG at a playback mechanism reset condition; and
  using the value of the PRNG to simulate film grain.

6. The method of claim 5, wherein the simulating of film grain is consistent irrespective of play mode.

7. The method of claim 6, wherein the play mode is trick play.

8. The method of claim 5, wherein the DVD playback mechanism reset condition comprises an insertion of a disc.

9. A method for simulating film grain in video using a pseudo random number generator (PRNG) by characterizing film grain in an original video image, comprising the steps of:
  obtaining (234) from the PRNG a PRNG seed at a beginning of a given frame in a sequence of decoded frames;
  applying (236) the same PRNG seed from the PRNG for the same given frame in the sequence during a pause thereof; and
  using the value of the PRNG to simulate film grain.

10. The method of claim 9, wherein the simulation of film grain is consistent irrespective of play mode.

11. The method of claim 10, wherein the play mode is trick play.

12. An apparatus for simulating film grain on a sequence of decoded pictures, comprising:
  means for receiving film grain information in a supplemental information message charactering film grain in an original video image;
  means for decoding the received film grain information; and
  a film grain simulator (154) for performing film grain simulation on the sequence of decoded pictures in accordance with the decoded film grain information applied in decode order to the sequence of decoded video pictures.

13. The apparatus of claim 12, wherein the simulating of film grain is bit accurate.

14. The apparatus of claim 12, wherein the simulating of film grain is consistent irrespective of play mode.

15. The apparatus of claim 14, wherein the play mode is trick play.

16. An apparatus for managing a pseudo random number generator (PRNG), comprising a film grain simulator for resetting at least one default value of the PRNG at a DVD playback mechanism reset condition and for simulating film grain using the value of the PRNG.

17. The apparatus of claim 16, wherein the simulating of film grain is consistent irrespective of play mode.

18. The apparatus of claim 17, wherein the play mode is trick play.

19. The apparatus of claim 16, wherein the DVD playback mechanism reset condition comprises an insertion of a disc.

20. An apparatus for simulating film grain in video using a pseudo random number generator (PRNG) by characterizing film grain in an original video image, comprising a film grain simulator (154) for (1) obtaining a PRNG seed at a beginning of a given frame in a sequence of decoded frames, (2) for applying the same PRNG seed for the same given frame in the sequence during a pause thereof; and (3) for using the value of the PRNG to simulate film grain.

21. The apparatus of claim 20, wherein the simulating of film grain is consistent irrespective of play mode.

22. The apparatus of claim 21, wherein the play mode is trick play.

23. An apparatus for simulating film grain in video using a pseudo random number generator (PRNG) by characterizing film grain in an original video image, comprising:
  means for obtaining a PRNG seed at a beginning of a given frame in a sequence of decoded frames;
  means for applying the same PRNG seed for the same given frame in the sequence during a pause thereof; and
  means for using the value of the PRNG to simulate film grain.

24. The apparatus of claim 23, wherein the simulating of film grain is consistent irrespective of play mode.

25. The apparatus of claim 24, wherein the play mode is trick play.

* * * * *